(12) United States Patent
Masuko et al.

(10) Patent No.: US 6,780,388 B2
(45) Date of Patent: Aug. 24, 2004

(54) ELECTRICALLY CONDUCTING FINE CARBON COMPOSITE POWDER, CATALYST FOR POLYMER ELECTROLYTE FUEL BATTERY AND FUEL BATTERY

(75) Inventors: Tsutomu Masuko, Nagano (JP); Yoichi Nanba, Nagano (JP)

(73) Assignee: Showa Denko K.K., Tokyo (JP)

( * ) Notice: Subject to any disclaimer, the term of this patent is extended or adjusted under 35 U.S.C. 154(b) by 169 days.

(21) Appl. No.: 09/867,596

(22) Filed: May 31, 2001

(65) Prior Publication Data

US 2002/0051903 A1 May 2, 2002

Related U.S. Application Data

(60) Provisional application No. 60/245,712, filed on Nov. 6, 2000, and provisional application No. 60/245,716, filed on Nov. 6, 2000.

(30) Foreign Application Priority Data

| May 31, 2000 | (JP) | ........................................ 2000-161973 |
| Jun. 12, 2000 | (JP) | ........................................ 2000-174982 |

(51) Int. Cl.$^7$ ................................................ C09C 1/48
(52) U.S. Cl. ................................ 423/449.1; 423/449.2; 429/231.8
(58) Field of Search ............................. 423/448, 449.1, 423/449.2, 460

(56) References Cited

U.S. PATENT DOCUMENTS

| 4,028,274 A | 6/1977 | Kunz |
| 5,871,552 A | 2/1999 | Tada |

FOREIGN PATENT DOCUMENTS

| EP | 0 086 884 A2 | 8/1983 | ............ H01M/4/96 |
| EP | 0 100 548 A2 | 2/1984 | ............ H01M/4/96 |
| JP | -60-027700 | 2/1985 | ............ C30B/29/62 |
| JP | A-60-152569 A | 8/1985 | ............ C09C/1/48 |
| JP | A-61-109258 A | 5/1986 | ............ H01M/4/88 |
| JP | A-61-119716 A | 6/1986 | ............ D01F/9/12 |
| JP | A-62-246813 A | 10/1987 | ............ C10B/31/04 |
| JP | A-62-287571 A | 12/1987 | ............ H01M/4/96 |
| JP | A-04-077307 A | 3/1992 | ............ C01B/31/04 |
| JP | A-05-144441 A | 6/1993 | ............ H01M/4/62 |
| JP | A-07-105955 A | 4/1995 | ............ H01M/4/88 |
| JP | -07-150419 A | 6/1995 | ............ D01F/9/27 |
| JP | A-07-206416 A | 8/1995 | ............ C10B/31/04 |
| JP | A-08287922 A | 11/1999 | ............ H01M/4/96 |
| JP | -2000-273351 A | 10/2000 | ............ C09C/1/56 |

OTHER PUBLICATIONS

Mochida, Isao et al. "Carbonization of Pitches—IV", Carbon, 1975, vol. 13, pp. 135–139.*
Mochida, Isao et al. "Carbonization of Aromatic Hydrocarbons—III", Carbon, 1975, vol. 13, pp. 489–493.*
Carbon Black Manual, May 25, 1972, 2$^{nd}$ Edition, K.K. The Publishing Company, Ltd., pp. 164–165; in Japanese, with English language translation.
Patent Abstracts of Japan, abstracting JP-A-60-027700 of Feb. 12, 1995.
Patent Abstracts of Japan, abstracting JP-A-07-150419 of Jun. 13, 1995.
Patent Abstracts of Japan, abstracting JP-A-2000-273351 of Oct. 3, 2000.
Patent Abstracts of Japan, abstracting JP-A-61-109258 of May 27, 1986.
Patent Abstracts of Japan, abstracting JP-A-04-077307 of Mar. 11, 1992.
Patent Abstracts of Japan, abstracting JP-A-07-206416 of Aug. 08, 1995.
Patent Abstracts of Japan, abstracting JP-A-62-246813 of Oct. 28, 1987.
Patent Abstracts of Japan, abstracting JP-A-60-152569 of Aug. 10, 1985.
Patent Abstracts of Japan, abstracting JP-A-62-287571 of Dec. 14, 1987.
Patent Abstracts of Japan, abstracting JP-A-61-119716 of Jun. 06, 1986.
Patent Abstracts of Japan, abstracting JP-A-05-14441 of Jun. 11, 1993.
Patent Abstracts of Japan, abstracting JP-A-07-105955 of Apr. 21, 1995.
Patent Abstracts of Japan, abstracting JP-A-08-287922 of Nov. 1, 1996.

* cited by examiner

*Primary Examiner*—Stuart L. Hendrickson
*Assistant Examiner*—Peter J Lish
(74) *Attorney, Agent, or Firm*—Sughrue Mion, PLLC (57) ABSTRACT

The present invention relates to (1) carbon powder having a primary particle size of 100 nm or less and an X-ray crystallite plane spacing $C_0$ of less than 0.680 nm, preferably of 0.6730 nm or less, which shows a volume resistivity of 0.1 Ω·cm or less in the pressurized state under a pressure of 2 MPa, and containing boron in a range of 0.1 to 5% by mass, (2) a method for producing the carbon powder, (3) an electrically conducting carbon composite powder wherein above-described carbon powder is mixed with fibrous carbon, particularly vapor grown carbon fiber, (4) a catalyst for solid polymer electrode fuel battery using above-described carbon powder or electrically conducting carbon composite powder, (5) a polymer electrolyte fuel battery cell using the catalyst, and (6) a polymer electrolyte fuel battery using the catalyst.

By using the carbon powder containing boron or an electrically conducting carbon composite powder, a high-performance polymer electrolyte fuel battery wherein power generation efficiency and durability are improved, can be obtained.

17 Claims, 1 Drawing Sheet

ELECTRICALLY CONDUCTING FINE CARBON COMPOSITE POWDER, CATALYST FOR POLYMER ELECTROLYTE FUEL BATTERY AND FUEL BATTERY

CROSS-REFERENCE TO RELATED APPLICATIONS

This application is based on the provisions of 35 U.S.C. Article 111(a) with claiming the benefit of filing dates of U.S. provisional applications Ser. Nos. 60/245,712 and 60/245,716 filed on Nov. 6, 2000 under the provisions of 35 U.S.C. 111(b), pursuant to 35 U.S.C. Article 119(e) (1).

TECHNICAL FIELD

The present invention relates to an electrically conducting fine carbon composite powder. More specifically, the present invention relates to fine carbon composite powder useful as an electrically conducting material for an electrode material used particularly in a Lithium(Li) battery, electrical double-layer capacitor and the like, and fine carbon composite powder useful for supporting a catalyst for use in a fuel battery, and also relates to the method for producing the powder, a catalyst for polymer electrolyte fuel battery using the carbon composite powder, a polymer electrolyte fuel battery cell and battery using the catalyst.

BACKGROUND ART

In recent years, use of carbon powder materials for Li battery, electrical double-layer capacitor, fuel battery and the like is increasing. Particularly, fine carbon powder represented by carbon black has heretofore been used as an electrical conductivity-imparting material (for example, added to a resin) or a sliding member and in addition thereto, is being widely used in a battery as an electrode material, an additive or a support for supporting a catalyst.

For example, in a Li battery, the fine carbon powder is used as an additive for maintaining the electrical conductivity between graphite powder particles which are the main material of the negative electrode. In a fuel cell, the fine carbon powder in the state of supporting platinum is coated on a carbon substrate and used as an electrode catalyst for the anode electrode, cathode electrode or the like. In an electrical double-layer capacitor, the fine carbon powder is used as an additive for maintaining the electrical conductivity between fine activated carbon particles which are the main material of the electrode. The carbon powder used in these applications is so-called submicron order sized carbon powder smaller than normal carbon powder having a size of $\mu m$ order obtained by the pulverization of coke or the like. By virtue of its small size, the carbon powder is useful as an electrical conducting material for improving the electrical conductivity between larger particles having a size of several $\mu m$ to tens of $\mu m$.

This fine carbon power is required to have properties comparable to normal graphite powder, more specifically, good electrical conductivity as an electrode and in the case of a battery, electrical or chemical properties such that the carbonaceous member is resistant against a corrosion by an acid.

Carbon black is a material having properties satisfying these requirements to a certain extent and is used over a wide range. In general, carbon commonly obtained from coke is graphitized, for example, by heating at a high temperature with an attempt to stabilize chemically and improve the corrosion resistance. However, carbon black is a material difficult to graphitize and can be hardly graphitized by mere heating.

Therefore, for example, JP-A-62-246813 (the term "JP-A" as used herein means an "unexamined published Japanese patent application") discloses a technique of adding boric acid to carbon black and heating the obtained slurry at a temperature of 1,000 to 2,000° C. to reduce the $d_{002}$ of carbon crystal, which is an index of showing the graphitization, even to 3.41 Å (0.341 nm), thereby attaining the graphitization. However, according to the study by the present inventors, $d_{002}$ of carbon black cannot be lowered to less than 3.40 Å which is by far larger than the theoretical value for complete graphite (i.e. 3.354 A). Furthermore, mere heating for the graphitization fails in elevating the electrical conductivity as demanded.

Therefore the first object of the present invention is to obtain graphitized fine carbon powder having excellent crystallinity and thereby increased in the resistance against chemical corrosion and at the same time, improved in the electrical conductivity, and to provide a high performance catalyst for polymer electrolyte fuel battery and polymer electrolyte fuel battery using the catalyst.

In order to cope with recent environmental pollution issue due to exhaust gas from the internal combustion engine of an automobile or the like, an electric vehicle (EV) is being developed as an alternative in recent years. To keep up with this tendency, a fuel cell is increasingly expected to undertake the power source for EV and therefor a compact and high-performance fuel cell is demanded.

The fuel cell includes various types of fuel cells such as, according to the kind of electrolytic solution used, alkali type, phosphoric acid type, fused carbonate type and polymer electrolyte type. Among these, a polymer electrolyte fuel cell is attracting an attention as a power source for electric vehicle (EV) because of its operability at a lower temperature, easy handling and high output density.

Figure 2:
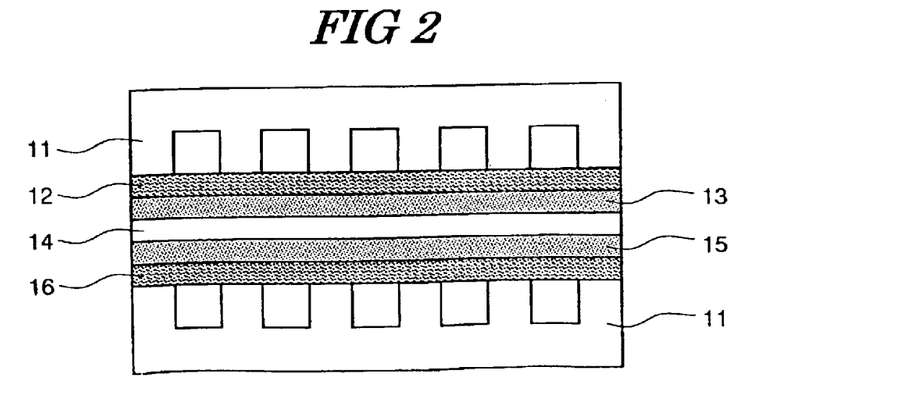
FIG. 2 is a cross-sectional view showing a basic constitution of a unit cell of a polymer electrolyte fuel battery, in which the complex powder according to the present invention is used in the catalyst layer.

For example, FIG. 2 shows a cross-sectional structure of one example of a unit cell used in a polymer electrolyte fuel battery. The fundamental structure of a unit cell is such that an ion exchange membrane 14 having appropriate water content is disposed in the center and sandwiched by the electrode comprising an anode catalyst layer 13 and a cathode catalyst layer 15. The anode catalyst layer 13 and the cathode catalyst layer 15 each is usually a sheet coated with a paste of carbon powder having supported thereon platinum or platinum alloy powder. The carbon powder is not particularly limited on the kind thereof as long as it has electrical conductivity, but those having a specific surface area large enough to support a catalyst are preferred and in general, carbon black is used.

In the outer side of the anode catalyst layer 13 and the cathode catalyst layer 15, electrically conducting anode gas-diffusing porous sheet 12 and cathode gas-diffusing porous sheet 16 for passing water and gas generated at the reaction are disposed respectively and in the outermost side, a carbon-based separator plate with grooves 11 is disposed to provide reaction gas passages, thereby constructing a unit cell. By stacking the many unit cells (several hundreds of cells) to form a multilayer structure, a high-output fuel battery is constructed.

Since the reaction of a fuel battery takes place on the catalyst layers, the greatest factor determining the energy amount of a fuel cell is how effectively to use the catalyst. In order to use the platinum catalyst with highest efficiency, the characteristics of carbon as the support such as electrical conductivity, adhesion of platinum (supporting property), corrosion resistance against electrolytic solution (ion) and heat conductivity need to be improved.

Furthermore, adhesion as a constituent element of a cell, for example, plane pressure to the ion exchange membrane and the gas diffusion sheet must be maintained over a long period of time.

The fuel battery having a structure such that hundreds of unit cells are stacked and the whole is cramped up under a predetermined cramping pressure is operated over a long period of time, the separator plate, the gas diffusion sheet and the like undergo creeping (a phenomenon that the thickness decreases) and although this creeping amount is small per unit cell, the sum total in the creeping amount of hundreds of cells as a whole is fairly large.

In this meaning, simple carbon black currently used as a support is not only deficient in the electrical conductivity necessary for a high-performance battery but also, when the battery is operated for a long period of time and the plane pressure between respective parts decreases to cause increase in the contact resistance between respective parts, the internal resistance of the battery increases and the battery performance disadvantageously deteriorates. Specifically, in the durability test over a time period in excess of ten hundreds of hours, the output often lowers to the level of 70 to 80%.

Therefore the second object of the present invention is to develop a catalyst support capable of compensating for the deterioration in the long-term durability of elemental carbon conventionally used as a catalyst support, to provide a catalyst support ensuring a higher maximum output, and a catalyst and a battery using the support.

DISCLOSURE OF THE INVENTION

As a result of extensive investigations by taking account of the above-described problems, the present inventors have found that by using carbon black that was considered to be hardly graphitized, submicron fine graphitized carbon powder having an X-ray plane spacing $C_0$ value (double of $d_{002}$) of less than 0.680 nm (namely, $d_{002}$ is less than 3.40 Å) can be obtained. Futhermore the present inventors succeeded to obtain a high-performance fuel battery by using the powder as a catalyst support for fuel battery.

In addition, the present inventors have found that by using an electrically conducting carbon composite powder for supporting catalyst, wherein carbon powder for supporting catalyst (carbon black) currently used is mixed with fibrous carbon, particularly with vapor grown carbon fiber, as a material for supporting a catalyst, a catalyst electrode having high output and high durability can be obtained.

Namely, the present invention relates to a carbon powder, the production method thereof, an electrically conducting carbon composite powder for supporting a catalyst having mixed therewith fibrous carbon, a catalyst for polymer electrolyte fuel battery, polymer electrolyte fuel battery cell, and polymer electrolyte fuel battery as described below.

1. Carbon powder having a primary particle size of 100 nm or less and an X-ray crystallite plane spacing $C_0$ of less than 0.680 nm.
2. The carbon powder as described in 1 above, which has a primary particle size of 100 nm or less and an X-ray crystallite plane spacing $C_0$ of 0.6730 nm or less.
3. The carbon powder as described in 1 or 2 above, which is carbon black.
4. The carbon powder as described in any one of 1 to 3 above, which shows a volume resistivity of 0.1 Ω·cm or less in the pressurized state under a pressure of 2 MPa.
5. The carbon powder as described in any one of 1 to 4 above, wherein boron content is in a range of 0.001 to 5% by mass.
6. The carbon powder as described in 5 above, wherein boron content is in a range of 0.1 to 5% by mass.
7. A method for producing the carbon powder as described in any one of 1 to 6 above, comprising adding boron carbide ($B_4C$) to carbon black in an amount of 0.01 to 7% by mass in terms of boron and heat-treating the mixture at 2,500° C. or more in a non-oxidative atmosphere.
8. The method for producing the carbon powder as described in 7 above, comprising adding boron carbide ($B_4C$) to carbon black in an amount of 0.5 to 7% by mass in terms of boron.
9. The method for producing the carbon powder as described in 7 or 8 above, wherein the carbon black is at least one kind selected from the group consisting of oil furnace black, acetylene black, thermal black, and channel black.
10. An electrically conducting carbon composite powder for supporting a catalyst, comprising carbon powder as described in any one of 1 to 6 above, having mixed therewith fibrous carbon.
11. The electrically conducting carbon composite powder for supporting a catalyst as described in 10 above, wherein the fibrous carbon is vapor grown carbon fiber.
12. The electrically conducting carbon composite powder for supporting a catalyst as described in 11 above, wherein from 1 to 7% by mass of vapor grown carbon fiber is mixed with carbon powder.
13. The electrically conducting carbon composite powder for supporting a catalyst as described in any one of 10 to 12 above, wherein the carbon powder is heat-treated at a temperature of 2,500° C. or more.
14. The electrically conducting carbon composite powder for supporting a catalyst as described in any one of 11 to 13 above, wherein the vapor grown carbon fiber is graphitized at a temperature of 2,500° C. or more and boron content in the fiber is in a range of 0.001 to 5% by mass.
15. The electrically conducting carbon composite powder for supporting a catalyst as described in 14 above, wherein the boron content in the vapor grown carbon fiber is in a range of 0.1 to 5% by mass.
16. A catalyst for polymer electrolyte fuel battery, primarily comprising platinum or a platinum alloy and the carbon powder as described in any one of 1 to 6 above for supporting the catalyst.
17. A catalyst for polymer electrolyte fuel battery, primarily comprising platinum or a platinum alloy and the carbon composite powder as described in any one of 10 to 15 above for supporting the catalyst.
18. A polymer electrolyte fuel battery cell using the catalyst as described in 16 or 17 above for anode catalyst layer and/or cathode catalyst layer.
19. A solid polymer electrode fuel battery comprising at least more than two of the stacked polymer electrolyte fuel battery cell as described in 18 above.
20. A polymer electrolyte fuel battery using the catalyst as described in 16 or 17 above for anode and/or cathode electrode.

DETAILED DESCRIPTION OF THE INVENTION

To begin with, the first group of the present invention: fine graphitized carbon powder having good crystallinity, production method thereof, an electrically conducting carbon composite powder for supporting a catalyst using the carbon powder, a catalyst for polymer electrolyte fuel battery, polymer electrolyte fuel battery cell, and polymer electrolyte fuel battery, will be described in detail below.

The raw material used for obtaining the carbon powder of the present invention is a submicron fine particle comprising an amorphous carbonaceous material called carbon black. Examples of the carbon black include oil furnace black (e.g., Ketjen Black, Valcan, both are trade names) obtained by incompletely combusting aromatic hydrocarbon oil such as creosote oil; acetylene black (e.g., Denka-Black, trade name) obtained by complete combusting method using acetylene as a raw material; thermal black obtained by complete combusting method using natural gas as a raw material; and channel black obtained by incomplete combusting method using natural gas as a raw material. Any of these can be used.

Among these carbon blacks, oil furnace black and acetylene black are preferred.

The reasons that the two are preferred are explained as follows. One of important factors determining the performance of carbon black as an electrically conducting material is a primary particle chain structure (aggregation structure) called structure. The structure of carbon black have generally this aggregation structure where fine spherical primary particles are gathered and form irregular chained branches. As the number of primary particles is larger and as the chained branches are more complicated (called high structure state), the effect of imparting electrical conductivity is higher. This high structure state can be easily formed in the oil furnace black and acetylene furnace black and therefore, these carbon blacks are preferred.

The carbon powder of the present inveniton can preferably contain boron. This carbon powder containg boron can be produced, for example, carbon black and boron compound such as boron carbide ($B_4C$), boron oxide and boron nitride are mixed, and the mixture is heat-treated at 2,500° C. or more in a non-oxidative atmosphere.

Among these methods, one preferable method where the carbon black is mixed with boron carbide ($B_4C$) and heated at a high temperature, that is not described in a literature, is explained below.

The boron carbide is ground to a particle size of 40 $\mu$m or less and then mixed with carbon black. The average particle size of boron carbide is preferably 20 $\mu$m or less. If the average particle size exceeds this range, the effect by the addition is small and also the yield and productivity decrease.

In the grinding, a commercially available general impact-type grinder (e.g., roller mill, ball mill, pulverizer) can be used. The boron carbide is difficult to grind and therefore, is preferably ground in advance to the mixing with carbon black.

The amount of boron carbide added is suitably from 0.01 to 7% by mass, preferably from 0.5 to 7% by mass as calculated in terms of boron. If the amount added is less than this range, the graphitization barely proceeds, whereas even if the amount added exceeds 7% by mass, the graphitization does not proceed any more and this is useless. The boron added in this range comes to be present in the carbon powder in an amount of 0.001 to 5% by mass, preferably 0.1 to 5% by mass and by virtue of this, the above-described graphitization effect can be brought out.

The boron carbide and carbon black may be mixed by any method without using any special machine as long as these are uniformly mixed.

The mixture of carbon black and boron carbide is preferably placed in a graphitic container and heat-treated in a non-oxidative atmosphere by passing an inert gas such as argon. The heat-treatment temperature must be 2,500° C. or more. If the temperature is less than this range, the graphitization does not proceed and the graphitic fine carbon powder having a plane spacing of a unit lattice ($C_0$ value) of less than 0.680 nm, furthermore 0.6730 nm or less for use in the present invention cannot be obtained.

The heat-treatment furnace for the graphitization may be any furnace as long as the heat-treatment can be performed at a desired temperature in a non-oxidative atmosphere and for example, an Acheson furnace utilizing carbon powder particles for the heat generation, a high frequency furnace and a furnace using a solid graphite heating element may be used. The non-oxidative atmosphere can be obtained by burying the material to be graphitized in the carbon powder or purging the inside of the furnace with an inert gas such as nitrogen gas or argon gas.

In the heating, after the entire material to be heated reaches a predetermined temperature, holding for a certain time is not particularly necessary. The heat-treated material is allowed to cool in the same non-oxidative atmosphere and ground by lightly stirring it.

If a boric acid which is in general easily available is mixed and heat-treated, instead of using boron carbide as the raw material of boron, enough reduction in the $C_0$ value cannot be attained by the graphitization, and it is difficult to make the $C_0$ value of less than 0.680 nm.

By the above-described method of the present invention, carbon black which is said usually non-graphitizable and difficult to graphitize, can be graphitized.

When the carbon fine powder of the present invention is measured by an X ray, the $C_0$ crystallite plane spacing (double of $d_{002}$) generally used as an index for showing the graphitization degree is less than 0.680 nm, furthermore 0.6730 nm or less. $C_0$ value as low as this level can not be attained using the submicron carbon powder.

The fine carbon powder of the present invention uses carbon black having a primary particle size of about several nm to about 100 nm as the raw material and is obtained by the partial aggregation of the carbons and therefore, after the graphitization, the particles having this primary particle size are aggregated as they are.

Even after the heat-treatment and grinding, the aggregated particles are estimated to have almost the same average particle size and distribution as those before the heat-treatment.

The primary particle size can be directly measured by the observation through TEM (transmission electron microscope), but the particle size distribution is mostly fixed by the manufacturing standard of carbon black. In the present invention, carbon powder having a primary particle size of 100 nm or less is suitably used and the graphitization product thereof also has a primary particle size within this range. $N_2$ absorption specific surface area (BET), which is decreased by graphitization, is preferably in a range of 50 to 400 $m^2/g$ in the present invention.

The particle size of the aggregated particle cannot be precisely measured because of the aggregation form such that primary particles are branched. When the average particle size is measured, for example, by the centrifugal precipitation method, the aggregated particles of the present invention are considered to be submicron particles having an average particle size of less than 1 μm.

Since the fine carbon powder of the present invention is heat-treated together with boron carbide, the graphitization can successfully proceed and the electrical conductivity can be improved as compared with ordinary carbon powder which is not subjected to a heat-treatment or subjected to a heat-treatment by not adding boron carbide.

The electrical conductivity (volume resistivity) can be measured by the following method.

Figure 1:
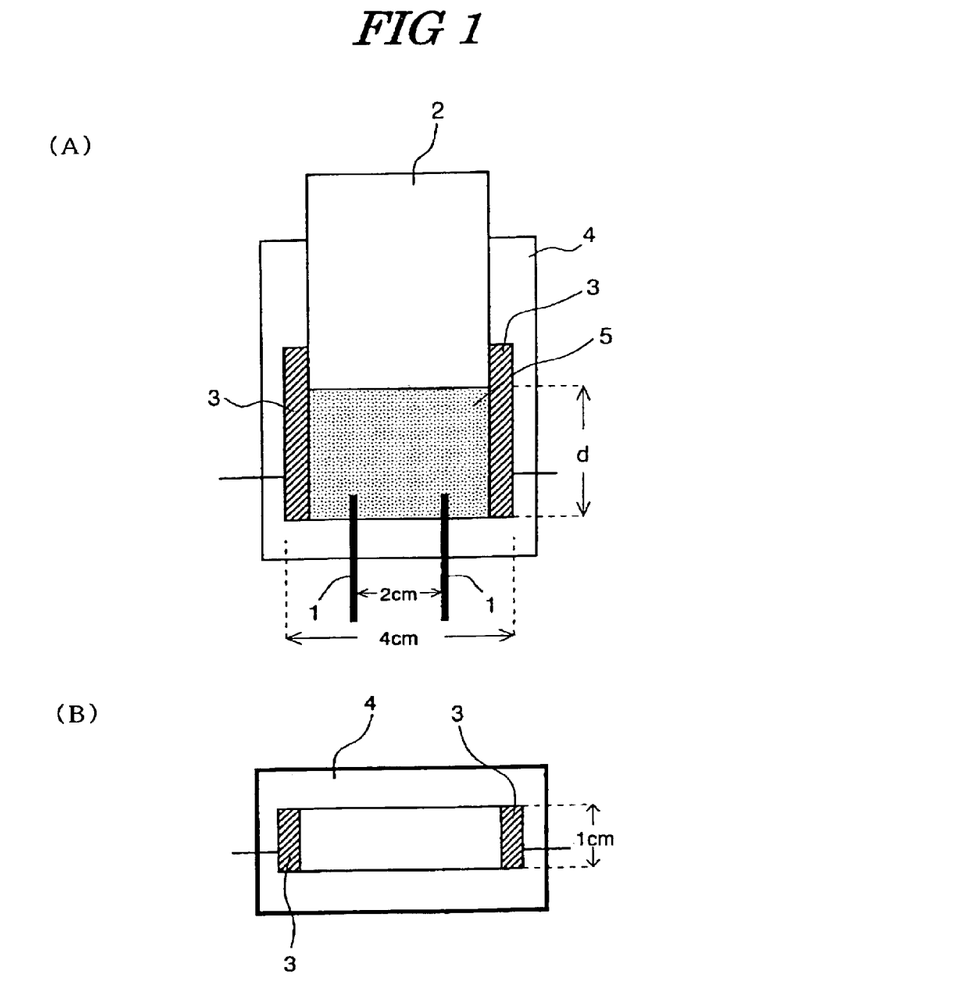
FIG. 1(A) is a schematic longitudinal cross-sectional view of a cell for measuring the volume resistivity of the carbon powder of the present invention.
FIG. 1(B) is a schematic plan view of a cell for measuring the volume resistivity of the carbon powder of the present invention.

A fine powder sample is filled in a resinous container shown in FIG. 1 and compressed from upper and lower sides using a compression rod. Under a constant pressure, a current is passed, the voltage between voltage measuring terminals provided in the powder is read, and the resistivity is calculated from the observed value, the cross-sectional area of the container and the distance between voltage terminals. The resistivity varies depending on the pressurization conditions and as the pressure applied is lower, the resistivity is higher. When the pressure applied is increased and exceeds a certain pressurization value, the resistivity is settled to almost a fixed value regardless of the pressurizing condition. In the present invention, a volume resistivity at the time when the pressure applied to the electrode of a normal battery is 2 MPa, is used as the object of comparison.

The volume resistivity-measuring cell used in the present invention is, as shown in FIG. 1, a resinous cell 4 equipped with copper plate-made current terminals 3 for passing a current through the powder material to be measured and having a plane area of 1×4 cm² in the depth of 10 cm. The cell has voltage measuring terminals 1 in the way and is combined with a compression rod 2 for pressing the powder material. A fixed amount of powder 5 (the sample to be measured) is filled in the cell and the powder is compressed by loading a pressure on the compression rod 2 from the above.

While measuring the pressure, a current of 0.1 A is sequentially passed and at the point of 2 MPa, the voltage (E) V between two voltage measuring terminals 1 at a distance of 2.0 cm inserted through the container bottom is read and the resistivity (R) Ω·cm is calculated according to the following formula:

$$R(\Omega \cdot cm)=(E/0.1) \times D(cm^2)/2(cm)$$

wherein D is a cross-sectional area (depth×width)=10 d of the powder material in the current direction.

When this measuring method is applied, the fine carbon powder of the present invention exhibits a volume resistivity of 0.1 Ω·cm or less under the pressurizing condition of 2 MPa. Particularly, for improving the electrical conductivity, the heat-treatment is preferably performed together with boron carbide so that the carbon powder can contain from 0.001 to 5% by mass, particularly 0.1 to 5% by mass of boron.

In order to use this fine carbon powder as a catalyst for electrode of a polymer electrolyte fuel battery, A mixture of powdery platinum or platinum alloy and this fine carbon powder can be used as main raw materials to construct an electrode.

FIG. 2 shows a cross-sectional structure of a unit cell of a polymer electrolyte fuel battery. The electrode is constructed such that an ion exchange membrane 14 having appropriate water content is disposed in the center and sandwiched by an anode catalyst layer 13 and a cathode catalyst layer 15. The anode catalyst layer 13 and the cathode catalyst layer 15 each is a sheet coated with a paste of carbon powder having supported thereon platinum or a platinum alloy. For this carbon powder, the carbon powder of the present invention can be used.

The unit cell is constructed such that in the outer side of each of the anode catalyst layer 13 and the cathode catalyst layer 15, an electrically conducting anode gas-diffusing porous sheet 12 and a cathode gas-diffusing porous sheet 16 are respectively disposed for passing water and gas generated at the reaction and in the outermost side, a carbon-based separator plate with grooves 11 is disposed to provide reaction gas passages. By stacking the unit cells to form a multilayer structure, a fuel battery is completed.

By using the carbon powder of the present invention as a raw material of the above-described catalyst, improvement can be attained in the electrical conductivity, chemical stability, power generation efficiency (power generated per unit volume), and also in durability owing to the decreased functional group on the surface of carbon black, and improvement of thermal decomposition initial temperature, as compared with the case where a conventional carbon black available on the market is similarly used as a raw material.

Next, the second group of the present invention: an electrically conducting carbon composite powder for supporting a catalyst comprising carbon powder mixed therewith fibrous carbon, a catalyst for polymer electrolyte fuel battery using the carbon composite powder, solid polymer fuel battery cell and solid polymer fuel battery using the catalyst, will be described below.

As a composite powder of the carbon powder and a fibrous carbon is used as a collector of catalyst support for fuel battery or the like, particularly as a support for catalyst layer of solid polymer fuel battery, a durability f or a long time use is improved, and higher output can be attained.

The carbon powder used in the composite powder of the present invention is the same powder as described in the first group of the invention of the graphitized fine carbon powder, commercially available carbon powder usually having an average primary particle size of 1 μm or less, particularly carbon black. According to the production process, carbon black is classified into oil furnace black obtained by incompletely combusting aromatic hydrocarbon oil, acetylene black obtained by complete combusting method using acetylene as a raw material, thermal black obtained by complete combusting method using natural gas as a raw material, and channel black obtained by incomplete combusting method using natural gas as a raw material. Any of these can be used.

In particular, oil furnace black and acetylene black are preferred, because the high structure state can be easily formed in these.

Among these, graphitized fine carbon powder having good cristalinity as described in the first group of the present invention is preferred.

The fibrous carbon for use in the present invention may be any of those called PAN-type or called pitch-type, those obtained by the vapor phase process, and those called nanotube having a size of the order of nanometer. Among these, vapor grown carbon fiber that is heat-treated and enhanced in the electric conductivity is preferred because of its appropriate elasticity.

The vapor grown carbon fiber (hereinafter simply referred to as "VGCF") is produced by thermally vapor-phase decomposing a gas such as hydrocarbon, in the presence of a metal-based catalyst.

Examples of the production method include a method where an organic compound such as benzene is used as a starting material, an organic transition metal compound such as ferrocene is used as a metal-based catalyst, and these are introduced together with a carrier gas into a high temperature reaction furnace to produce VGCF on a substrate (see, JP-A-60-27700), a method where VGCF is produced in the suspension state (see, JP-A-60-54998 (U.S. Pat. No. 4,572, 813)), and a method where VGCF is grown on a reaction furnace wall (see, Japanese Patent 2,778,434).

In JP-B-3-64606 (the term "JP-B" as used herein means an "examined Japanese patent publication")(WO86/03455), a metal-containing particle previously supported on a refractory support such as alumina or carbon, is contacted with a carbon-containing compound at a high temperature to obtain VGCF of 70 nm or less.

VGCF produced by any of these methods can be used in the present invention.

VGCF constituting carbon composite powder of the present invention suitably has a fiber diameter of 20 to 300 nm and a fiber length of less than 100 $\mu$m. This VGCF is mixed with carbon black in a ratio from 1 to 7% by mass, preferably from 2 to 6% by mass, of the carbon powder (carbon black).

The diameter of VGCF is preferably 20 nm or more because if the diameter is less than 20 nm, the VGCF can be hardly mass-produced in industry, which is not practical, and due to the fineness, the handling is cumbersome but the effect is not so high. On the other hand, if the diameter exceeds 300 nm, the fibers are poorly entangled for the particle size or shape of carbon black and the effect on the electrical conductivity cannot be obtained by the addition thereof.

If the fiber length exceeds 100 $\mu$m, the fibers cannot be uniformly blended with carbon black and the effect as a composite powder can be hardly obtained.

The vapor grown carbon fiber takes a branched structure in many cases. In this case, the fiber length means a length from a branch point of a branch to the distal end or to the next branch point.

If the amount of VGCF added is less than 1% by mass, the addition effect can be hardly obtained, whereas if it exceeds 7% by mass, the ratio of carbon black as a support on which a platinum catalyst is supported, decreases and the cell characteristics are reduced.

The pitch-type carbon fiber and PAN-type carbon fiber have a fiber length in excess of 100 $\mu$m and each fiber as it is cannot be uniformly blended with carbon black, and taking account that the electrical conductivity imparting effect is low, VGCF is preferred.

In the present invention, the carbon black is preferably heat-treated at a temperature of 2,500° C. or more, more preferably heat-treated in the state of the carbon black being mixed with a boron compound such as boron carbide, boron oxide or boron nitride particularly boron carbide, at 2,500° C. or more in a non-oxidative atmosphere such that the carbon black comprises from 0.001 to 5% by mass, preferably from 0.1 to 5% by mass, more preferably from 0.5 to 5% by mass of boron.

By heat-treating the carbon black at 2,500° C. or more, not only high electrical conductivity is attained but also the characteristics such as chemical stability and heat conductivity are improved and when this carbon black is used as a catalyst support of a fuel battery, the power generation efficiency (power generated per unit volume) is improved and the durability (the ratio of maximum output after the continuous use for 1,000 hours or more, to the initial maximum output) is also improved.

Particularly, in the case of carbon black elevated in the crystallinity by the heat-treatment at 2,500° C. or more, these improvements on the characteristics of a battery are remarkable. For this purpose, the crystallinity is elevated in the present invention by the addition of boron as means for elevating graphitization crystallinity.

The boron compound and carbon black may be mixed by any method without using any special machine as long as these can be uniformly mixed.

The heat-treatment furnace may be any furnace as long as the heat-treatment can be performed at a desired temperature and, for example, an Acheson furnace, a high frequency furnace and a furnace using a graphite heating element may be used.

The non-oxidative atmosphere can be obtained, in the case of Acheson furnace, by burying the material to be heated in the carbon powder and in the case of other furnaces, by purging the atmosphere with an inert gas such as nitrogen or argon, according to the necessity.

The heat-treatment time is not particularly limited as long as the time period is long enough for the heated material as a whole to reach a predetermined temperature.

VGCF is usually used after burning it at a temperature around 1,000° C. after the production. However, when VGCF used is heat-treated in the same manner as in the carbon black, particularly, by mixing with a boron compound and then heat-treated, the VGCF can have improved electrical conductivity, and VGCF can contribute to the improvement of the battery characteristics (power generation efficiency, durability) as a catalyst in a cell manufactured.

The boron compound used here may be any compound as long as a desired boron content can be obtained after the heat-treatment, but in view of easy availability and workability, it is preferably an inorganic boron compound, more preferably boron carbide.

The amount of the boron compound added before the heat-treatment must be in excess of the target content because boron may be volatilized out depending on the heat-treatment conditions. The appropriate amount of the boron compound added is in a range of 0.01 to 10% by mass as calculated in terms of boron.

By mixing from 1 to 7% by mass of VGCF with carbon black and using the uniform mixture as the powder for supporting a catalyst in the catalyst layer, the cell characteristics can be greatly improved. In the mixing, the powder is uniformly mixed using a continuous system mixer such as screw feeder and cycle feeder, or a batch-system mixer such as mixing roll and banbury mixer.

The carbon black and VGCF may also be previously mixed before the heat-treatment and then heat-treated. At this time, the above-described boron compound may also be previously added and heat-treated. In these heat-treatments, the same effect can be obtained.

Platinum or a platinum alloy may be supported on the composite powder by the method described below or the like. The composite powder is added to an ethanol solution having dissolved therein, for example, chloroplatinic acid hexahydrate and mixed, the resulting solution is evaporated to dryness on a hot plate while stirring to obtain platinum compound-supported powder, this platinum compound-supported powder is added to a hydrazine monohydrate solution, and the mixture is stirred, washed with ion exchanged water and dried to obtain metal platinum-supported powder.

To a mixture of this platinum-supported powder and ion exchange resin or a mixture of this platinum-supported powder, ion exchange resin, water-repellent resin, and added distilled water or a solvent and thoroughly stirred in a ball mill or the like to form a paste. This paste is coated on a carbon paper and dried at a temperature sufficiently high to thoroughly volatilize the solvent and the formed layer can be used as a catalyst layer.

Examples of the ion exchange resin include perfluorocarbon resin having, as the ion exchange group, a sulfonic acid group or a carboxylic acid group. Examples of the water-repellent resin include polytetrafluoroethylene.

THE BEST MODE FOR CARRYING OUT THE INVENTION

The present invention will now be explained in more detail with reference to the following examples and comparative examples, but the present invention is not particularly limited by these examples.

EXAMPLES 1 TO 7 AND COMPARATIVE EXAMPLES 1 TO 9

The raw material carbon black used was furnace black (N330 and N110 (trade names), produced by Showa Cabot K.K.; Valcan XC-72, black pearl 2000(trade name), produced by Cabot; and Ketjen Black EC-600JD (trade name), produced by Lion Corp.) or acetylene black (Denka Black (trade name), produced by Denki Kagaku Kogyo K.K.). Any of these carbon black used are particulate type (aggregated type).

Above-described carbon black and previously ground boron carbide powder having an average particle size of about 20 μm were mixed in a dry system in an amount described in Table 1 using a LABOMIXER manufactured by Hosokawa Micron K.K. and the obtained powder was used as the sample for Examples 1 to 7 of the present invention.

For the purpose of comparison, boron carbide was not added (Comparative Examples 2, 5 and 8), boric acid and carbon black were mixed in warm water at 70° C. to prepare a slurry and this slurry was dried at 130° C., measured on the weight to determine the amount of boric acid added (Comparative Examples 3, 4, 6 and 7), and used as the Comparative Sample.

In the heat-treatment, each sample was placed in a graphite box and the box was buried in an Acheson furnace and kept at a predetermined temperature for 5 minutes. In the comparative example 1, the predetermined temperature (heat-treatment temperature) is set under 2500° C. (2180° C.). The experimental conditions of Examples 1 to 7 and Comparative Examples 1 to 8 are shown in Table 1.

TABLE 1

| | Raw Material Carbon Black | Heat-Treatment Temperature ° C. | Amount of Boron Carbide Added (% by mass, as boron) | Amount of Boric Acid Added (% by mass, as boron) |
|---|---|---|---|---|
| Example 1 | N330 | 2830 | 0.5 | 0 |
| Example 2 | Valcan XC-72 | 2780 | 3.0 | 0 |
| Example 3 | N110 | 2910 | 7.0 | 0 |
| Example 4 | N330 | 3020 | 4.0 | 0 |
| Example 5 | EC-600JD | 2990 | 4.0 | 0 |
| Example 6 | Denka Black | 2650 | 4.0 | 0 |
| Example 7 | Black Pearl 2000 | 2720 | 4.0 | 0 |
| Comparative Example 1 | N330 | 2180 | 7.0 | 0 |

TABLE 1-continued

| | Raw Material Carbon Black | Heat-Treatment Temperature ° C. | Amount of Boron Carbide Added (% by mass, as boron) | Amount of Boric Acid Added (% by mass, as boron) |
|---|---|---|---|---|
| Comparative Example 2 | Valcan XC-72 | 2970 | 0 | 0 |
| Comparative Example 3 | N110 | 2690 | 0 | 6.3 |
| Comparative Example 4 | N330 | 3010 | 0 | 5.7 |
| Comparative Example 5 | EC-600JD | 3010 | 0 | 0 |
| Comparative Example 6 | EC-600JD | 3000 | 0 | 4.3 |
| Comparative Example 7 | Denka Black | 2890 | 0 | 4.8 |
| Comparative Example 8 | Black Pearl 2000 | 2880 | 0 | 0 |

After the heat-treatment, each sample was cooled to normal temperature in a non-oxidative atmosphere and ground by the LABOMIXER described above.

Thereafter, the $C_0$ value was measured by X-ray diffraction and the volume resistivity was calculated from the voltage decrease at 2 MPa using the measuring cell described above. Boron (B) in the carbon powder at this time was pre-treated and analyzed by Inductively Coupled Plasma (ICP) Emission Spectroscopy.

The results obtained are shown in Table 2. For Reference, the measured data of 6 kinds of commercially available carbon black products are shown together.

TABLE 2

| | B Content, mass % | Co Value (nm) | Consolidation Resistivity (mΩ · cm) |
|---|---|---|---|
| Example 1 | 0.3 | 0.6719 | 72 |
| Example 2 | 1.9 | 0.6719 | 60 |
| Example 3 | 4.3 | 0.6715 | 74 |
| Example 4 | 2.0 | 0.6710 | 52 |
| Example 5 | 2.1 | 0.6711 | 37 |
| Example 6 | 3.0 | 0.6719 | 50 |
| Example 7 | 2.2 | 0.6771 | 82 |
| Comparative Example 1 | 6.9 | 0.6890 | 176 |
| Comparative Example 2 | — | 0.6875 | 120 |
| Comparative Example 3 | 1.5 | 0.6823 | 138 |
| Comparative Example 4 | 1.4 | 0.6805 | 117 |
| Comparative Example 5 | — | 0.6861 | 87 |
| Comparative Example 6 | 0.9 | 0.6807 | 72 |
| Comparative Example 7 | 1.2 | 0.6819 | 122 |
| Comparative Example 8 | — | 0.6850 | 121 |
| N110 | — | immeasurable (no peak) | 221 |
| N330 | — | immeasurable (no peak) | 238 |
| Valcan XC-72 | — | immeasurable (no peak) | 158 |
| EC600JD | — | immeasurable (no peak) | 119 |
| Denka Black | — | 0.6980 | 144 |
| Black Pearl 2000 | — | immeasurable (no peak) | 122 |

Then, using Denka Black, a boron(B)-containing heat-treated sample (Example 6) or a boron(B)-free heat-untreated normal commercially available sample (granular product) (Comparative Example 9) was used after pulverizing for supporting the catalyst, evaluation of the unit cell of a polymer electrolyte fuel battery was performed.

Using each of the above-described two samples, a catalyst layer was formed as follows and a unit cell comprised as shown in FIG. 2 for a polymer electrolyte fuel battery was manufactured and evaluated on the battery characteristics.

In a ball mill, 1.5 g of carbon black sample powder having supported thereon 30% by mass of platinum, 10 g of a 5% by mass solution of fluorine-type ion exchange resin (Nafion, trade name, produced by Du Pont) and 5 g of distilled water were mixed for 30 minutes to obtain a paste. This paste was coated on a gas diffusion layer comprising carbon sheet (SCT sheet, trade name, produced by Showa Denko K.K.) treated with 30% by mass of water-repellent polytetra fluoroethylene resin. Subsequently, the paste was dried at 60° C. for 10 minutes and heated at 130° C. and 200 N/cm$^2$ for 1 minute to manufacture a gas diffusion electrode in which a catalyst layer supporting 1 mg/cm$^2$ of platinum was formed.

As shown in FIG. 2, the thus-manufactured electrode (one is anode catalyst layer 13/anode gas diffusion porous sheet 12 and another is cathode catalyst layer 15/cathode gas diffusion porous sheet 16) and a separator plate with grooves 11 (250 mm×250 mm×8 mm) were disposed to oppose each other with intervention of an ion exchange membrane (Nafion, trade name, produced by Du Pont) 14 and thereby constitute a unit cell of a polymer electrolyte fuel battery.

This unit cell was operated using hydrogen as the fuel gas and air as the oxidizing gas under an applied pressure of 10 N/cm$^2$. From the maximum output in this operation, the battery characteristics of a polymer electrolyte fuel battery were evaluated.

For the evaluation of durability, a continuous operation was performed at an output of 0.3 W/cm$^2$ for 4,000 hours and the output retention (a ratio of the output after the operation for 4,000 hours to the output at the initiation of operation) was determined.

Carbon black, boron(B) content, and cell characteristics (maximum output, retention) of a unit cell employing a catalyst using the carbon black are shown in Table 3.

TABLE 3

| | Conditions in the Production of Carbon Black Used | | Characteristics of Single Cell | |
|---|---|---|---|---|
| Sample Powder Used | Amount of B Added, mass % | Heat-Treatment Condition, ° C. | Maximum Output, W/cm$^2$ | Durability, % |
| Example 6 | 4.0 | 2650 | 0.31 | 84 |
| Comparative Example 9 | 0 | none | 0.13 | 75 |

From the results of Tables 1 to 3, according to the present invention, submicron carbon powder succeeded in the progress of graphitization which has been heretofore impossible, can be obtained. Due to the graphite crystallization, this carbon powder is improved in the chemical stability and the electrical conductivity and therefore, is useful as a material for battery. The polymer electrolyte fuel battery using this carbon powder as a catalyst is obviously improved in the power generating property and the durability as compared with conventional batteries.

EXAMPLES 8 TO 19 AND COMPARATIVE EXAMPLES 10 TO 12

As the carbon black, the following powder samples were prepared.
(1) Heat-Untreated Product
Acetylene black (Denka Black, trade name, granular type) (hereinafter simply referred to as KCB) produced by Denki Kagaku Kogyo K.K. was used as a sample as it is.

(2) Graphitization Heat-Treated Product
Furnace black (Shoblack, trade name, granular type) produced by Showa Cabot K.K. was filled in a graphite-made crucible and burned at respective temperatures of 2,500° C. and 2,700° C. in an Acheson furnace over 10 days to prepared samples different in the treatment temperature. This heat-treated carbon black is hereinafter simply referred to as GrCB.
(3) Graphitization Heat-Treated Product Comprising Boron
Furnace black produced by Showa Cabot K.K. and previously pulverized boron carbide powder produced by Denki Kagaku Kogyo K.K. were mixed, filled in a graphite-based crucible and burned at respective temperatures of 2,500° C. and 2,700° C. in an Acheson furnace to prepare samples different in the treatment temperature. After the heat-treatment, the boron content of each sample was confirmed by the chemical analysis. This heat-treated carbon black comprising boron is hereinafter simply referred to as B-GrCB.

As the vapor grown carbon fiber, 5 samples of vapor grown carbon fibers (VGCF, trade name) produced by Showa Denko K.K. having an approximate diameter size of 30 nm, 50 nm, 100 nm, 200 nm and 300 nm were prepared.

As a result of observation through scanning electron microscope (SEM), these all had a fiber length of less than 100 μm and all showed a branched structure form.

These fibers were treated in a condition described in Table 4 to prepare various samples of vapor grown carbon fiber samples that were individually burned in a non-oxidative atmosphere (VGCF1 to VGCF6), samples that were subjected to the same graphitization heat-treatment as the (3) graphitization heat-treated product comprising boron described above, and samples that wrere heat-treated boron carbide produced by Denki Kagaku Kogyo K.K which had been pulverized and mixed in a screw feeder (B-VGCF1 to B-VGCF6).

TABLE 4

| Sample No. | Heat-Treatment Temperature (° C.) | Fiber Diameter Size (nm) | Boron Content (mass %) |
|---|---|---|---|
| VGCF 1 | 1200 | 300 | 0 |
| VGCF 2 | 1200 | 200 | 0 |
| VGCF 3 | 1200 | 30 | 0 |
| VGCF 4 | 2800 | 300 | 0 |
| VGCF 5 | 2800 | 200 | 0 |
| VGCF 6 | 2800 | 50 | 0 |
| B-VGCF 1 | 2500 | 200 | 0.5 |
| B-VGCF 2 | 2500 | 200 | 3 |
| B-VGCF 3 | 2500 | 200 | 7 |
| B-VGCF 4 | 2700 | 300 | 5 |
| B-VGCF 5 | 2700 | 200 | 0.5 |
| B-VGCF 6 | 2700 | 100 | 3 |

Using each of these samples, a catalyst layer was formed as follows and then, as shown in FIG. 2, a unit cell of a polymer electrolyte fuel battery was manufactured and evaluated on the battery characteristics.

1.5 g of carbon black having supported thereon 30% by mass of platinum or 1.5 g of composite powder of the carbon black and VGCF or B-VGCF (see, Table 5 (5-1,2-2)) having supported thereon 30% by mass of platinum, 10 g of a 5% by mass concentrated solution of fluorine type ion exchange resin (Nafion, trade name, produced by Du Pont) and 5 g of distilled water were mixed for 30 minutes in a ball mill to obtain a paste. This paste was coated on a gas diffusion layer comprising carbon sheet (SCT sheet, trade name, produced by Showa Denko K.K.) treated with 30% by mass of water-repellent polytetrafluoroethylene resin. Subsequently, the paste was dried at 60° C. for 10 minutes and heated at 130° C. under a pressure of 200 N/cm² for 1 minute to manufacture a gas diffusion electrode in which a catalyst layer supporting platinum corresponding to 1 mg/cm² was formed.

As shown in FIG. 2, the thus-manufactured electrode (one is anode catalyst layer 13/anode gas diffusion porous sheet 12 and another is cathode catalyst layer 15/cathode gas diffusion porous sheet 16) and a separator plate 11 with grooves (250 mm length×250 mm width×8 mm thickness) were disposed to oppose each other with intervention of an ion exchange membrane (Nafion, trade name, produced by Du Pont) 14 and thereby constitute a unit cell of a polymer electrolyte fuel battery.

This unit cell was operated using hydrogen as the fuel gas while passing an oxidizing gas (air) under an applied pressure of 10 N/cm², and the battery characteristics of a polymer electrolyte fuel battery were evaluated.

For the evaluation of durability, a continuous operation was performed at an output of 0.3 W/cm² for 4,000 hours and the output retention (a ratio of the output after the operation for 4,000 hours to the output at the initiation of operation) was determined.

The blending conditions of carbon black and VGCF, and the evaluated battery characteristics (maximum output, retention) of a unit cell employing a catalyst using the carbon black and VGCF are shown in Table 5 (5-1, 5-2)

TABLE 5-1

Production Conditions and Blending Ratio of Composite Powder

| | Carbon Black | | | VGCF | | Blending Ratio | Characteristics of Unit Cell | |
| | | Heat- | | | | Amount of | | |
| | Type | Treatment Temperature, ° C. | Boron Content, mass % | Kind | Boron Content, mass % | VGCF Added, mass % | Maximum Output, W/cm² | Durability, % |
|---|---|---|---|---|---|---|---|---|
| Example 8 | KCB | — | — | VGCF 1 | — | 5 | 0.43 | 93 |
| Example 9 | KCB | — | — | VGCF 4 | — | 5 | 0.45 | 95 |
| Example 10 | KCB | — | — | B-VGCF 1 | 0.5 | 3 | 0.42 | 98 |
| Example 11 | KCB | — | — | B-VGCF 4 | 5 | 3 | 0.46 | 97 |
| Example 12 | GrCB | 2500 | — | VGCF 3 | — | 7 | 0.45 | 93 |
| Example 13 | GrCB | 2700 | — | VGCF 4 | — | 7 | 0.49 | 96 |
| Example 14 | GrCB | 2500 | — | B-VGCF 2 | 3 | 4 | 0.50 | 97 |
| Example 15 | GrCB | 2700 | — | B-VGCF 5 | 0.5 | 4 | 0.49 | 98 |
| Example 16 | B-GrCB | 2500 | 3 | VGCF 1 | — | 2 | 0.51 | 93 |
| Example 17 | B-GrCB | 2700 | 0.5 | VGCF 5 | — | 2 | 0.47 | 98 |
| Example 18 | B-GrCB | 2500 | 5 | B-VGCF 3 | 7 | 1 | 0.49 | 97 |
| Example 19 | B-GrCB | 2700 | 7 | B-VGCF 6 | 3 | 1 | 0.48 | 98 |

TABLE 5-2

Production Conditions and Blending Ratio of Composite Powder

| | Carbon Black | | | VGCF | | Blending Ratio | Characteristics of Unit Cell | |
| | | Heat- | | | | Amount of | | |
| | Type | Treatment Temperature, ° C. | Boron Content, mass % | Kind | Boron Content, mass % | VGCF Added, mass % | Maximum Output, W/cm² | Durability, % |
|---|---|---|---|---|---|---|---|---|
| Comparative Example 10 | KCB | — | — | — | — | — | 0.11 | 73 |
| Comparative Example 11 | GrCB | 2700 | — | — | — | — | 0.28 | 81 |
| Comparative Example 12 | B-GrCB | 2700 | 7 | — | — | — | 0.32 | 85 |

From the results of Table 4 to 5 (5-1,2-2), instead of using conventional simple carbon black as a catalyst support in a polymer electrolyte fuel battery, by using the composite powder of the present invention as the support and a catalyst layer mainly comprising a mixture of this composite powder and platinum or a platinum alloy for the electrode, the power generation efficiency is greatly elevated and also the long-term durability over ten hundreds of hours is enhanced.

What is claimed is:

1. Carbon black having a primary particle size of 100 nm or less and an X-ray crystallite plane spacing $C_0$ of 0.6730 nm or less, and having a boron content in a range of 0.001 to 5% by mass, which shows a volume resistivity of 0.1 Ω.cm or less in the pressurized state under a pressure of 2 MPa.

2. The carbon black as claimed in claim 1, wherein the boron content is in a range of 0.1 to 5% by mass.

3. The carbon black as claimed in claim 1, wherein $N_2$ absorption specific surface area (BET) is in a range of 50 to 400 m²/g.

4. A method for producing the carbon black as claimed in claim 1, comprising adding boron carbide ($B_4C$) to carbon black in an amount of 0.01 to 7% by mass in terms of boron and heat-treating the mixtures at 2,500° C. or more in a non-oxidative atmosphere.

5. The method for producing the carbon black as claimed in claim 4, comprising adding boron carbide ($B_4C$) to carbon black in an amount of 0.5 to 7% by mass in terms of boron.

6. The method for producing the carbon black as claimed in claim 4 or 5, wherein the carbon black is at least one kind selected from the group consisting of oil furnace black, acetylene black, thermal black, and channel black.

7. An electrically conducting carbon composite powder for supporting a catalyst, comprising carbon black as claimed in any one of claims 1, 2 or 3 having mixed therewith fibrous carbon.

8. The electrically conducting carbon composite powder for supporting a catalyst as claimed in claim 7, wherein the fibrous carbon is vapor grown carbon fiber.

9. The electrically conducting carbon composite powder for supporting a catalyst as claimed in claim 8, wherein from 1 to 7% by mass of vapor grown carbon fiber is mixed with carbon black.

10. The electrically conducting carbon composite powder for supporting a catalyst as claimed in claim 7, wherein the carbon black is heat-treated at a temperature of 2,500° C. or more.

11. The electrically conducting carbon composite powder for supporting a catalyst as claimed in claim 8, wherein the vapor grown carbon fiber is graphitized at a temperature of 2,500° C. or more and boron content in the fiber is in a range of 0.001 to 5% by mass.

12. The electrically conducting carbon composite powder for supporting a catalyst as claimed in claim 11, wherein the boron content in the vapor grown carbon fiber is in a range of 0.1 to 5% by mass.

13. A catalyst for polymer electrolyte fuel battery, primarily comprising platinum or a platinum alloy and the carbon black as claimed in any one of claims 1, 2 or 3 for supporting the catalyst.

14. A catalyst for polymer electrolyte fuel battery, primarily comprising platinum or a platinum alloy and the carbon composite powder as claimed in claim 7 for supporting the catalyst.

15. A polymer electrolyte fuel battery cell using the catalyst as claimed in claim 13 for anode catalyst layer and/or cathode catalyst layer.

16. A solid polymer electrode fuel battery comprising at least more than two of the stacked polymer electrolyte fuel battery cell as claimed in claim 15.

17. A polymer electrolyte fuel battery using the catalyst as claimed in claim 13 for anode and/or cathode electrode.

* * * * *